Patented Apr. 19, 1927.

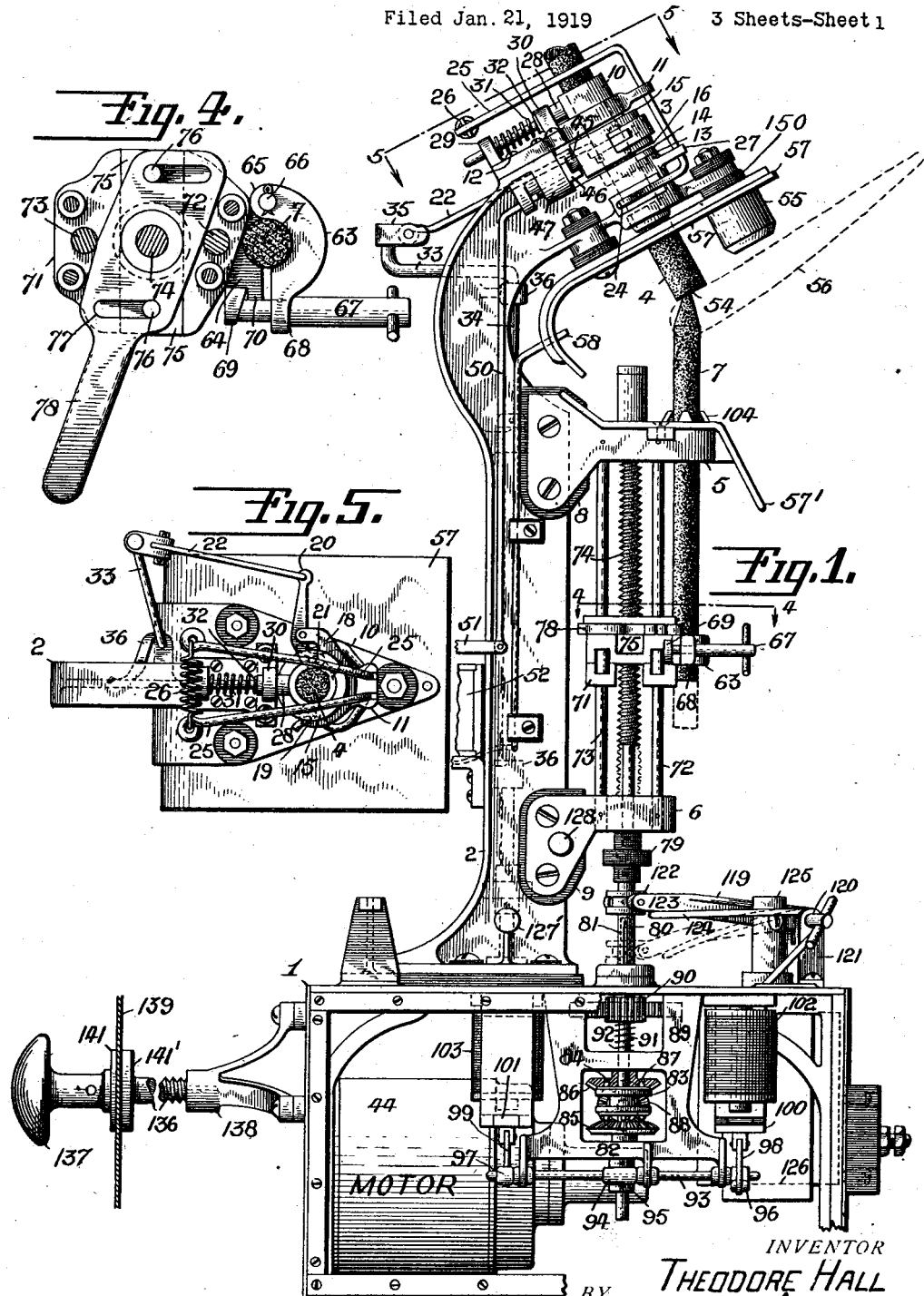

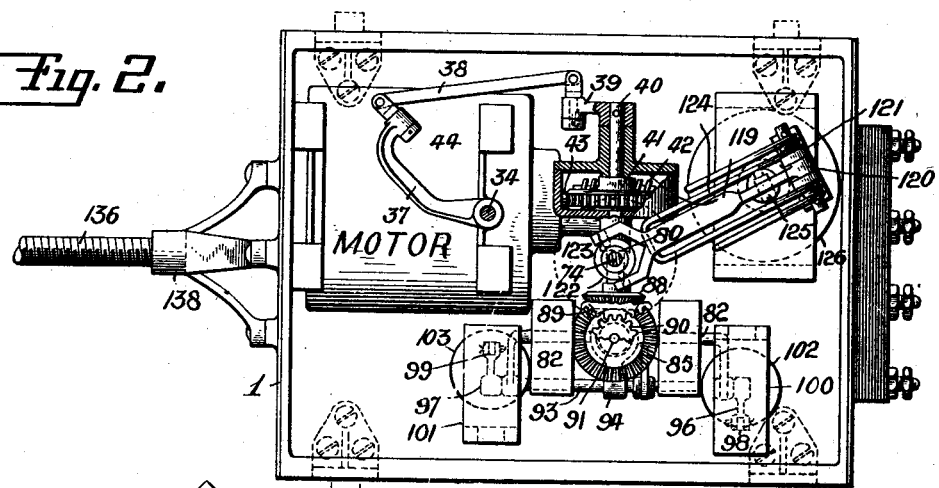
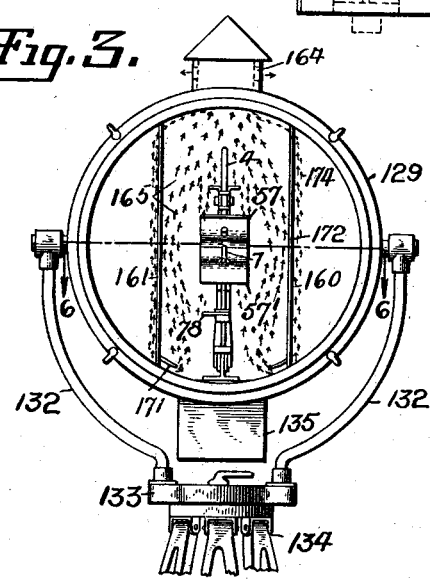
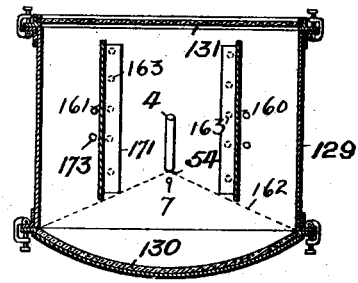
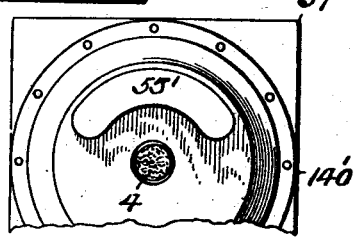
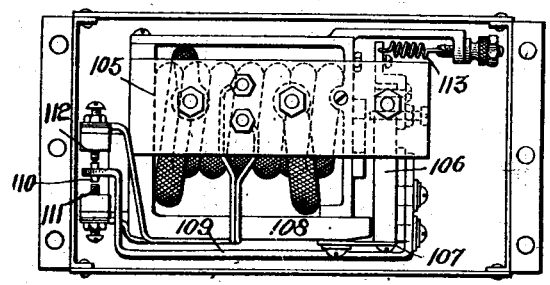

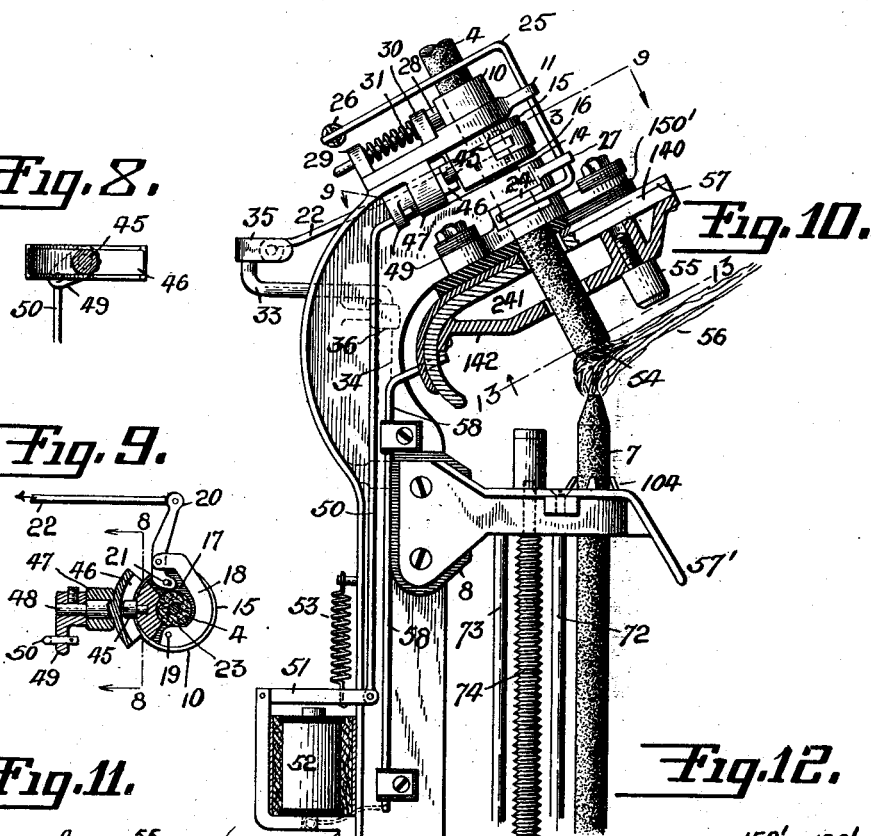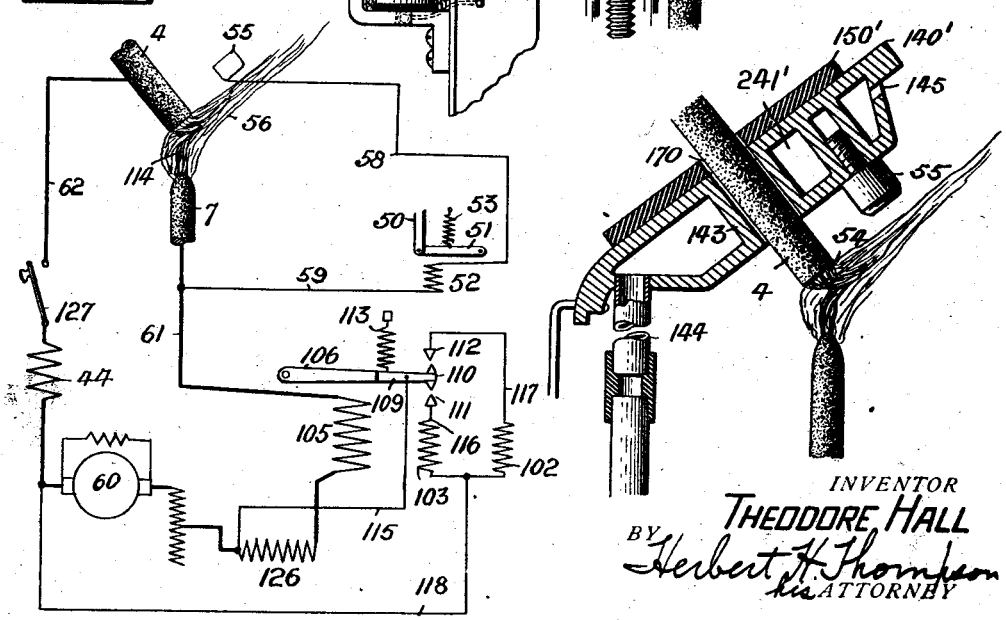

1,625,315

UNITED STATES PATENT OFFICE.

THEODORE HALL, OF BROOKLYN, NEW YORK, ASSIGNOR TO THE SPERRY GYROSCOPE COMPANY, OF BROOKLYN, NEW YORK, A CORPORATION OF NEW YORK.

FLAMING-ARC FLOODLIGHT.

Application filed January 21, 1919. Serial No. 272,328.

This invention relates to high-intensity flaming arc lamps, adapted for general or interior illumination and especially for the illumination of moving picture studios.

The main object of the invention is to provide apparatus, for automatically operating the electrodes in accordance with the method set forth in the Letters Patent, No. 1,227,210, to Elmer A. Sperry for improvements in method of operating flaming arc lights for projectors, particularly adapted for studio work or flood lighting.

In studio work or flood lighting, particularly in motion picture work, it is the practice to use direct illumination as distinguished from a reflected beam, that is, the light enters the field of illumination directly from the positive crater. Therefore, to get the maximum light into the field, the positive electrode crater should fully face the object illuminated. Since the studio lamp units employed for the purposes stated are usually elevated above the objects illuminated, in my present invention, the positive electrode is angularly arranged to permit the whole beam from the positive crater to enter the field to be illuminated, and thereby obtain the maximum illumination.

A further object is to provide an arc lamp of the type specified wherein the maximum illumination for the purpose stated may be obtained and objectionable shadows eliminated. Heretofore it has been common to arrange the electrodes in line in a horizontal plane with the result that a shadow is present in the center of the light. Also it is old to arrange the electrodes in a straight line in a vertical plane with the result that much of the light emitted by the positive crater is cast directly vertically downwards and is hence lost. By the arrangement of the electrodes which I have provided, however, the central shadow is eliminated and the maximum amount of light from the positive crater made available, while at the same time the high intensity flaming arc phenomenon referred to in the aforesaid patent to Elmer A. Sperry is retained.

Another object is to provide means for preventing spindling of the positive electrode back of the arcing end thereof.

Other objects will appear as the invention is more fully brought out in the following specification.

Referring to the drawings wherein I have shown what I now consider to be the preferred form of my invention:

Fig. 1 is a side elevation of the lamp.

Fig. 2 is a plan view of the control box with the cover removed.

Fig. 3 is a front elevation of the lamp within a searchlight drum mounted on a tripod with the lamp in the position for direct or flood lighting.

Fig. 4 is a detail of the negative electrode holder or carriage, taken on line 4—4, Fig. 1.

Fig. 5 is a top view of the positive electrode head taken on line 5—5, Fig. 1.

Fig. 6 is a section of the lamp drum taken on line 6—6, Fig. 3, showing diagrammatically the position of the electrodes therein when a reflector is employed.

Fig. 7 is a view of a current control device.

Figs. 8 and 9 are details of means for regulating the rate of feed of the positive electrode. Fig. 8 being taken on line 8—8, Fig. 9, and Fig. 9 a section on line 9—9 of Fig. 10.

Fig. 10 is a view of the electrode holders, showing a modified form of positive electrode head wherein a dead air chamber attachment is provided.

Fig. 11 is a wiring diagram of the lamp and its controlling mechanism.

Fig. 12 is a modification of the form of positive electrode head shown in Fig. 10.

Fig. 13 is a view taken substantially on line 13—13, Fig. 10, showing a modification in the form of electric terminal used to control the position of the arcing face of the positive electrode.

In Fig. 1, the control box is shown at 1. A standard 2, the upper end of which may have formed integral therewith or attached thereto a holder 3 for the positive electrode 4, is mounted on said control box. As shown, holder 3 forms a part of standard 2. Said standard carries a pair of brackets 5 and 6 for the negative electrode 7; said brackets being insulated from said standard by means of insulation 8 and 9.

The positive electrode holder includes a member 10 rotatably mounted in bracket 11 secured by screws 12 to the standard 2. Said member 10 is provided with a bore through which the electrode 4 passes. The electrode also passes through a bore in the end 14 of standard 2 as indicated by dotted lines 13. Member 10 is provided with an enlarged portion 15 between bracket 11 and the end 14 of standard 2; a slight clearance being left as at 16 so that member 10 may move longitudinally in bracket 11.

The enlarged part 15 of member 10 is provided with a cut-away portion 17 (see Fig. 9) into which fits a lever 18, pivotally attached at one end to part 15 at 19, and at the other end to a second lever 20; said lever 20 being in turn pivotally attached at one end to part 15 at 21 and at the other end to a rod 22. The pulling of said rod in the direction of the arrow will cause lever 18 to press against electrode 4 at 23 and cause member 10 and electrode 4 to move slightly in a counter-clockwise direction. If rod 22 then moves back the pressure of lever 18 against electrode 4 will become released and member 10 will be caused to move back slightly in a clockwise direction. During the said back movement of member 10, I desire to hold the electrode still. This will be accomplished by means of the brushes 24 reaching through the end 14 of standard 2 and pressed by means of levers 25 and spring 26 (see also Fig. 5) against the electrode; said levers being pivoted, as shown, in bracket 11 and bracket 27 on standard 2.

In order to prevent member 10 from rotating upon a slight movement of rod 22 before lever 18 grips the electrode, I may employ a braking member 28 slidably mounted in brackets 29 and 30 and pressed against said member 10 by spring 31 resting at one end against bracket 29 and at the other against shoulder 32 on said braking member 28. It will thus be seen that a reciprocatory movement of rod 22, will effect a step-by-step rotation of the positive electrode 4. The reciprocatory movement of said rod 22 may be effected as follows:

Rod 22 is pivotally attached to the upper crank end 33 of a crank rod 34 by means of a link 35. Said rod is rotatably mounted in brackets 36 fixed on standard 2 and reaches down into the control box 1 (see Fig. 2), and is provided with a second crank 37 connected by means of a link 38 to a crank 39 on the shaft 40 of a worm wheel 41. Said worm wheel is adapted to be driven by worm 42 on the shaft 43 of a motor 44 which may run constantly while the lamp is in operation. The operation of motor 44 will through worm wheel 41 crank 39 and link 38 transmit an oscillatory motion to crank 37 and through rod 34 to crank 33, thus in turn effecting the reciprocatory movement of rod 22.

I desire also to provide means for feeding the positive electrode longitudinally to compensate for consumption. For this purpose I employ a stud 45 integral with member 10, projecting into a grooved member 46 pivotally carried in a boss-like portion 47 of standard 2. Fixed on the shaft 48 of said grooved member 46 is an arm 49 to which is fastened a rod 50 (see also Figs. 9, 10) reaching downwardly and attached to the armature 51 of an electro-magnet 52. A spring 53 may be provided to hold armature 51 normally in the open or up position as shown in Fig. 10. When armature 51 closes, pulling rod 50 downwardly, grooved member 46 will be caused to rotate slightly (see Fig. 8).

Preferably said grooved member 46 normally occupies a position at a slight angle to the path of stud 45 on member 10, so that at each movement of member 10 causing electrode 4 to rotate, said member will be caused to move longitudinally, carrying the electrode forward with it a distance equal to the amount of consumption of said electrode, or slightly less than said amount of consumption. The electrode being released during the back movement of member 10 will not recede with the receding of member 10.

The above described mechanism for feeding and rotating the positive electrode is shown and described in greater detail in my copending application for gearless feed and rotating mechanism for electrodes, Serial No. 235,771, filed May 21, 1918.

It will thus be seen that when the lamp is in operation, the positive electrode 4 will be constantly rotated step-by-step, and fed forward at a rate slightly less than the rate of consumption. Means may then be provided to effect the energization of magnet 52 in response to the exact position of the arcing face 54 of said electrode for turning grooved member 46 through a greater angle to cause said electrode to feed more rapidly. For this purpose I have shown an electric terminal 55 adjacent the arc flame 56. This terminal may be integrally connected to a shield 57 back of the arc, which shield is in turn electrically connected by a conductor 58 to magnet 52 (see also wiring diagram in Fig. 11), and insulated at 150 from standard 2. The other side of said magnet is shown connected by wire 59 to the negative side of the electrical source 60 through the main line 61. A current will pass from source 60, line 62, electrode 4, the arc flame 56, the gases surrounding said flame, terminal 55, line 58, coil 52, thence through lines 59 and 61 back to source 60. When the arcing face of the positive electrode recedes so that the flame 56 approaches to within a predetermined distance from terminal 55, the current passing from the terminal to the flame and through coil 52 is designed to overcome the tension of spring 53 and pull down upon armature 51 to effect the aforesaid rotation of grooved member 46. Throughout the operation of the lamp, the position of the arcing face of the positive electrode will thus be automatically maintained in a substantially fixed position.

Referring now to the negative electrode 7 and the means for controlling and actuating the same, the electrode is shown as gripped between the jaws 63, 64 of a clamping device 65. Said jaws are hinged together at 66. A locking member 67 is shown passing through jaw 63 and may be provided with a shoulder 68. The end of said member is provided with a cam-like knob 69 engaging a projection 70 on jaw 64. The turning of the locking member will tighten or loosen the grip of the clamping device around the electrode. Said clamping device 65 is an integral part of a carriage 71 slidably mounted on guide rods 72, 73 attached to brackets 5, 6. A threaded feed rod 74 bearing slidably up and down in brackets 5, 6 engages a pair of threaded members 75 in carriage 71. A pin 76 in each of members 75 reaches upwardly into slots 77 in a lever 78 on carriage 71. In the position shown in Fig. 4 threaded members 75 are in engagement with feed rod 74. A slight counter-clockwise rotation of lever 78 around rod 74 will cause the spreading of threaded members 75 by reason of the pins 76 engaging slots 77, so that carriage 71 may be quickly adjusted up or down rod 74.

Rod 74 is connected through insulation 79 to a sleeve 80 slidably but non-rotatably fitting over a rod 81 on which is fixed a gear 89 meshing with pinion 90 on shaft 91. Shaft 91 is rotatably mounted in frame 82 and carries a double disc member 83 provided with pins 84 adapted to engage one or the other of bevel gears 85, 86 in holes 87. Said bevel gears 85, 86 are loosely mounted on rod 81 and are constantly rotated by bevel gear 88 on shaft 40 (see also Fig. 2). A spring 92 may be provided resting on frame 82 and engaging pinion 90 for normally holding discs 83 in a central position disengaged from either of bevel gears 85, 86. A rod 93 rotatably supported in frame 82 is provided with a bifurcated arm 94 engaging the shaft 91 between collars 95. The ends of rod 93 are provided with oppositely directed arms 96, 97 connected by links 98, 99 to the armatures 100, 101 of electro-magnets 102, 103. The energization of one or the other of said magnets 102, 103 will by rocking rod 93 raise or lower shaft 91 (pinion 90 being wide enough to permit such movement without disengaging gear 89) so as to effect the clutching of discs 83 with one or the other of bevel gears 85, 86 to cause a rotation in one direction or the other through shaft 91 and gears 90, 89 of the feed rod 74, to raise or lower carriage 71 with electrode 7; the electrode sliding up or down through guides 104 fixed in bracket 5.

I desire to provide means for controlling the energization of magnets 102, 103 in accordance with the current across the arc. For this purpose I may employ an electromagnet 105 with an armature 106 having a rocking attachment through a flexible means 107 to frame 108. An arm 109 is shown secured to armature 106 and carrying contacts 110 adapted to engage one or the other of contacts 111, 112. A spring 113 may hold armature 106 normally open and thus maintain contacts 110, 112 normally closed. In the wiring diagram, Fig. 11, magnet 105 is shown as connected in series with the arc. When the current across the arc 114 is of a predetermined value the strength of magnet 105 is designed to overcome the tension of spring 113 sufficiently to open contacts 110—112 but not sufficiently to close contacts 110—111, so that contact 110 is in neutral position as shown in the wiring diagram. When, on the other hand, the current across the arc exceeds the aforesaid predetermined value magnet 105 is designed to effect the closing of contacts 110—111.

Arm 109 carrying contacts 110 is shown connected to the source 60 through line 115, while contacts 111, 112 are connected through lines 116, 117 to electro-magnets 103, 102 respectively, the other side of which magnets are in turn connected through line 118 to the other side of source 60.

It will thus be seen that after the arc has been struck, the current passing across the arc and through coil 105 will control the position of contact 110 relative to contacts 111, 112 and consequently the condition of magnets 103, 102, so that when the arc is burning with the proper current niether of magnets 103, 102 will be energized and electrode 7 will remain stationary; but that as the electrode is consumed and the arc becomes too long, magnet 102 becomes energized and the electrode will be caused to move toward the positive electrode, while if the arc becomes too short by reason of the feeding of the positive electrode so that the current across the arc increases, or if for any other reason the said current should exceed the aforesaid predetermined value, magnet 103 will predominate and cause the negative electrode to move away from the positive electrode until the proper current value is reestablished. By this means the current across the arc will be maintained at a fixed value and the light produced will be constant.

For striking the arc when the current is turned on I have shown a lever 119 pivoted at one end 120 to a post 121 secured to the control box 1 and engaging at the other end 123 sleeve 80 between collars 122 fixed thereon. A spring 124 may be provided for normally holding lever 119 and consequently rod 74 and the negative electrode 7 in the up position as shown, so that the electrode 7 touches electrode 4. Lever 119 is also shown as attached to the armature 125 of a solenoid 126. In Fig. 11 solenoid 126 is shown in series with the arc.

When current is turned on by closing switch 127, a closed circuit will be established from source 60 through line 62, through electrodes 7 and 4 which as shown in Fig. 1 are normally in engagement with each other, and back through line 61 including solenoids 105 and 126. This will energize solenoid 126 causing armature 125, lever 119, feed rod 74, and electrode 7 to be pulled down as indicated by dotted lines, thus drawing the arc and producing the flame indicated by dotted lines 56. The current passing through terminal 55 will now control the position of the positive electrode, while the current passing through solenoid 105 will control the position of the negative electrode with respect to the positive.

Current may be carried to the electrodes by attaching the positive lead to a binding post 127' on standard 2 and the negative lead to binding post 128 on bracket 6. The current will then pass through standard 2 and enter electrode 4, whence it will flow across the arc and through electrode 7, guide brushes 104, and carriage 71, back to binding post 128. In this connection it will be seen that the upward flowing current in standard 2 will exert a repelling effect upon the downward flowing current across the arc, thus effecting a steadying influence upon the arc flame 56 in the direction shown.

In Fig. 3 I have shown the lamp mounted in a drum 129 substantially similar to a searchlight drum. In Fig. 6 the drum is shown as provided with a projector 130 and a front glass 131. The drum is pivotally carried by a pair of arms 132 secured to a member 133 which may be rotatably clamped to the top of a tripod 134 so that it may readily be reversed.

To use the lamp for flood lighting for studio purposes the projector 130 may be removed as shown in Fig. 3 and the lamp turned around and the light permitted to emanate directly, the projector being used when a beam is desired.

In Figs. 1, 3, and 5 a head or shield 57 is shown above the arc for protecting the rear part of the positive electrode 4 and the mechanism associated therewith from the arc and flame produced thereby. A similar shield 57' (Figs. 1 and 3) may be employed below the arc for preventing droppings from the burning electrodes from falling upon the feed rod 74 or other associated parts and clogging them.

When the lamp is in the drum 129 the control box 1 is adapted to be slidably mounted in a compartment 135 depending from the drum 129 as shown in Fig. 3. A rod 136 having a knob or the like 137 and having threaded engagement with a bracket 138 fixed to the control box 1 may project through the front wall 139 of compartment 135. A pair of collars 141, 141' may be fixed on rod 136 on either side of said wall 139. Turning of knob 137 will thus shift control box 1 backward or forward in compartment 135, and consequently vary the distance of the tip 54 of the positive electrode from the projector 130. This will enable the operator to readily vary the width of the beam.

In Fig. 10 I have shown a modified electrode head 140 for the positive electrode 4 in the form of a hollow sleeve positioned on the forward portion of the holder 3. By the forward portion of the holder I mean the portion nearest the arcing end of the electrode. In this form an enclosed air space 241 is provided, surrounding the electrode back of the burning end 54. The walls 142 surrounding said air space may be metallic and terminal 55 may be directly attached thereto and conducting rod 58 attached to said walls. These walls may also form the shield back of the arc.

The dead air space surrounding the electrode adjacent its burning end will prevent spindling of the electrode since all the oxygen therein will be burned out a few minutes after the arc is lighted by the red hot carbon. Also heat will be abstracted from the electrode at a greater rate than with the arrangement heretofore employed using a refractory, heat insulating sleeve. (See the United States patent to Elmer A. Sperry, No. 1,362,575, dated December 14, 1920, quartz sleeve 210, Fig. 6.)

In Fig. 12 the air in the space 241' does not touch the electrode 4, but is separated therefrom by partition 143 in the form of a tube through which the electrode passes. Air may then be forced into space 241' through tube 144 and permitted to circulate through the space and out through holes 145 adjacent the top of the electrode head 140'. This circulation of air will serve to keep the electrode head and the end of the electrode adjacent its arcing face 54 cool and prevent spindling of said electrode to an even more marked degree than the form shown in Fig. 12, since the cooled walls of tube 143 absorb heat from the red hot electrode very rapidly by both radiation and the convection currents of the dead air between the electrode and said tube. The space 170 between the electrode 4 and wall 143 may be so small as not to offer an opportunity for a sufficient supply of oxygen to consume the electrode materially at this point.

The principal advantage of the space 170 is to insulate the head or sleeve 140' from the electrode, the said sleeve being insulated from the holder 3 by insulation 150' (see also Fig. 10). This will not only permit terminal 55 to be made an integral part of sleeve 140' but will prevent any tendency toward arcing over from the negative electrode to the said sleeve. It is further noted that the form shown in Fig. 12 possesses an added advantage, since the third electrode button 55, itself, is air cooled, being mounted on the insulated air cooled holder 143. This feature, however, of the air cooled third electrode is not claimed herein but is claimed in my application, Serial No. 459,765, filed April 8, 1921 on "air cooled projector lamps," which application is to that extent, therefore, a continuation of the present application.

In Fig. 13, the terminal 55' is shown encompassing a sufficient portion of a circle around the electrode 4 to care for lateral wanderings of the arc flame.

By the arrangement of the electrodes which I have provided, as shown particularly in Figs. 10 and 12, I have found that a light especially desirable for direct illumination or flood lighting purposes is obtained in that such light provides maximum illumination and is devoid of objectionable shadows. I have shown electrodes 4 and 7 in a vertical plane, by which arrangement I avoid the central shadow which is present in lights wherein the electrodes are arranged horizontally. It should further be noted that I have shown said electrodes tilted relatively to each other. Particularly, by tilting the positive crater with relation to the negative electrode, as shown, I render available much of the light which would otherwise be lost were the crater pointed directly downwards since the crater constitutes the light source. Also, by tilting said electrodes relatively to each other I preserve the high intensity flaming arc phenomenon disclosed in the patent to Elmer A. Sperry previously mentioned whereby the maximum brilliancy is obtained. It will thus be seen that my arrangement of electrodes results in the production of a light of maximum efficiency for purposes of flood lighting or interior illumination.

In Figs. 3 and 6 I have shown partitions 160, 161 extending from the top to the bottom of the drum 129 as shown in Fig. 3, but being of a sufficient distance from the projector 130 (Fig. 6) to permit the light rays indicated by dotted lines 162 to reach the outer edge of said projector. Air may be permitted to enter the drum through suitable openings, such as small holes 163 under baffles 171 at the bottom of the drum. Outlet openings represented at 164 may be provided at the top of the drum. The draught created by the heat of the lamp will cause the air to enter the drum through holes 163 and pass upwardly and out through openings 164, as indicated by arrows 165. Partitions 160, 161 will act as guides to this current of air, confining it more strictly to the regions in greatest need of ventilation. The partitions being adjacent the sides of the arc absorb a great deal of heat at their central portion 172. This heat causes a rapid upward movement of air at this point, and consequently draws a large part of the air entering through holes 163 to this point as shown by the dotted lines 165. By controlling the air within the drum in this manner a marked steadying effect is produced upon the arc. Holes 173 may be located on the outer side of partitions 160, 161 to permit a current of air to pass up against the outer side thereof as represented by arrows 174 to aid in cooling of said partitions.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an arc lamp, an electrode holder, a metallic head on the forward part of said holder insulated therefrom and adapted to surround an electrode without touching the same, means for feeding an electrode through said holder, and means electrically connected with said head for controlling said feeding means in response to the approach of the arc flame to said head.

2. In an arc lamp, an electrode holder, a metallic sleeve on the forward part of said holder insulated therefrom and adapted to surround an electrode, a projection on said sleeve electrically connected therewith, means for feeding an electrode through said holder, and means electrically connected with said projection, and adapted to be actuated by the approach of the arc flame to said projection, for controlling said feeding means.

3. In an arc lamp, a pair of electrode holders, means associated with one of said holders for feeding an electrode, a metallic shield on said holder and adapted to surround said electrode adjacent its arcing end, an electric terminal on said shield, and means for controlling said feeding means adapted to be connected in electrical circuit with said shield and one of said electrodes.

4. In an arc light, the combination with an electrode holder, of means for maintaining the arc in a predetermined position including an electric conductor positioned on said holder and means responsive to the proximity of the arc to said conductor and adapted to operate by the flow of current from the arc, and constantly driven mechanism for rotating the electrode.

5. In an arc lamp, an electrode holder, an electric conductor at the portion thereof adjacent the arc, feeding and rotating mechanism for the electrode comprising an electrode engaging surface movable back and forth across the periphery of the electrode, means for causing engagement of said surface with the electrode in one direction only for moving such surface, and means controlled by the proximity of the arc flame to said conductor for altering the plane of such movement to control the feed.

6. In a flaming arc light, a positive and a negative electrode, the crater of the positive electrode containing the principal light source, means for feeding the positive electrode, a third electrode above the arc in the path of the tail flame, and means controlled by the relative position of said third electrode and said arc for controlling said feeding means to maintain said source in a given position.

7. In an arc light for photography, a drum having an opening in each end, a negative electrode therein, a positive electrode positioned therein with its crater inclined to the negative electrode and pointing towards one end of the drum, means whereby a reflector may be secured to such end and a rotatable mounting for the drum.

8. In an arc light for photography, a drum having an opening in each end, a negative electrode therein, a positive electrode positioned therein with its crater inclined to the negative electrode and pointing towards one end of the drum, and means whereby a reflector may be secured to such end.

9. In an arc lamp for projector purposes, the combination with the positive and negative electrode holders of a metallic forward portion on the positive electrode holder insulated therefrom and adapted to surround the electrode without touching the same, means for rotating and feeding the positive electrode through its holder, and means electrically connected with said forward portion for controlling said feeding means in response to the approach of the arc flame to said portion, and independent feeding means for the negative electrode.

10. In an arc lamp, an electrode holder, a head on said holder and through which said electrode extends, said head having means for cooling said electrode and for shielding the hot portion of said electrode from the moving air, means for feeding said electrode through said head, and means for controlling said feeding means comprising an electric circuit including said head.

In testimony whereof I have affixed my signature.

THEODORE HALL.